(12) United States Patent
Gibbs (10) Patent No.: US 11,331,599 B2
(45) Date of Patent: May 17, 2022

(54) TANK TOOL FOR A TANK HAVING ONE OR MORE FLUIDS AND PROCESSES PERFORMED USING THE TANK TOOL

(71) Applicant: Paul Gibbs, Midland, TX (US)

(72) Inventor: Paul Gibbs, Midland, TX (US)

( * ) Notice: Subject to any disclaimer, the term of this patent is extended or adjusted under 35 U.S.C. 154(b) by 463 days.

(21) Appl. No.: 16/282,243

(22) Filed: Feb. 21, 2019

(65) Prior Publication Data

US 2020/0269158 A1 Aug. 27, 2020

(51) Int. Cl.
*B01D 19/00* (2006.01)
*B01D 17/02* (2006.01)
*A62C 3/06* (2006.01)

(52) U.S. Cl.
CPC .......... *B01D 17/0214* (2013.01); *A62C 3/065* (2013.01); *B01D 19/0036* (2013.01); *B01D 19/0063* (2013.01)

(58) Field of Classification Search
None
See application file for complete search history.

(56) References Cited

U.S. PATENT DOCUMENTS

| | | | | |
|---|---|---|---|---|
| 2,548,384 A | * | 4/1951 | Marshall | A62C 3/06 169/68 |
| 5,143,603 A | * | 9/1992 | Gibbs | B01D 17/0214 210/122 |
| 7,504,037 B2 | | 3/2009 | Gibbs | |
| 8,210,271 B2 | | 7/2012 | Gibbs | |
| 2009/0321089 A1 | * | 12/2009 | Gibbs | A62C 3/065 169/45 |
| 2015/0048176 A1 | * | 2/2015 | Jones | A62C 5/008 239/8 |
| 2017/0056787 A1 | * | 3/2017 | Bell | B01D 21/307 |

FOREIGN PATENT DOCUMENTS

WO WO2009/149134 12/2009

* cited by examiner

*Primary Examiner* — Jonathan Miller
(74) *Attorney, Agent, or Firm* — Merek, Blackmon & Voorhees, LLC (57) ABSTRACT

A multi-function tank tool including a body, an internal passageway, an upper end and a lower end. The lower end is configured to connect a hose so that a fluid travels in the internal passageway. The upper end includes at least one opening communicating with an interior of the tank. A first hose can be connected to a lower end of the body. The tank may have oil, vapor and an oil/vapor interface. The tank tool can perform at least one of the following: grounding an interior of the tank using at least the tank tool and the first hose; agitating one or more fluids traveling through the internal passageway to mix the one or more fluids traveling through the internal passageway; directing a hot oil adjacent the oil/vapor interface using at least the tank tool and the first hose; and, attaching the tool to a floating tank roof.

15 Claims, 11 Drawing Sheets

TANK TOOL FOR A TANK HAVING ONE OR MORE FLUIDS AND PROCESSES PERFORMED USING THE TANK TOOL

FIELD OF THE INVENTION

The present invention is directed to a tank tool for a tank having one or more fluids and one or more processes/methods facilitated and/or performed using the tank tool. The preferred processes/methods facilitated and/or performed by the tank tool may include but are not limited to one or more of the following: (i) grounding an interior of the tank using at least the tank tool and at least one hose connected to the tank tool; (ii) agitating one or more fluids traveling (e.g., upwardly or downwardly) through an internal passageway of the tank tool to mix the one or more fluids traveling through the internal passageway; (iii) directing a hot oil adjacent the liquid/gas interface (e.g., oil/vapor interface) using at least the tank tool and at least one hose connected to the tank tool; and/or, (iv) attaching one or more tank tools to a floating tank roof.

BACKGROUND OF THE INVENTION

The storage of liquids including but not limited to flammable liquids (e.g., oil, gasoline, etc.) and an associated vapor/gas in a tank has numerous inherent issues/problems. For example, a fire can occur in the tank which is extremely undesirable.

There is a need for a tank tool that injects a fire suppression or extinguishing substance (e.g., fire foam) into the tank where all individuals associated with the injection process are at a safe distance from the tank during the injection process and with the suppression or extinguishing substance being injected into the tank in a superior/optimal condition to suppress/extinguish the fire in an extremely short time period.

Also, the tank may periodically need to be cleaned by injecting large volumes of one or more cleaning fluids/substances (e.g., cleaning chemical(s) and water) into the tank with the one or more cleaning fluids/substances. There is a need for a tank tool that injects into the tank the one or more cleaning fluids/substances in a superior/optimal condition to effectively and thoroughly clean the tank.

Further, bad oil in the tank needs to be treated or an evacuation method/process must be established where no bad oil is evacuated during the evacuation method/process. For example, a tank tool is needed that includes an oil removal port for removing only good oil from the tank (i.e., oil that is not 99% or greater pure oil) located above the approximately four foot of bad oil at the bottom of a tank. Another example is the need for a tank tool configured to allow the injection of one or more chemicals at or adjacent the tank's top liquid level to treat bad oil by a chemical treater (i.e., an individual or individuals) located in a safe area. Traditionally, a chemical treater is on the top of the tank while adding one or more chemicals to the tank through one or more lids or access areas formed in the top of the tank to treat the bad oil. A tank tool is need where the chemical treater is nowhere near one or more lids or access areas formed in the top of the tank and/or the cleaning substance is released in the tank a superior/optimal condition.

Moreover, there is a need for a tank tool that evacuates vapor including the heaviest vapor molecules from the tank such that the vapor during evacuation remains in a state that the vapor will not block partially or completely one or more hoses/conduits used to evacuate the vapor from the tank including vapor having the heaviest molecules that can readily form condensation in the one or more hoses/conduits used to evacuate the vapor.

There also exists a need for a tank tool that has one or more detachable floats where the float or floats are configured such that varying the length of the one or more detachable floats while maintaining the diameter of the floats constant or substantially constant allows the tank tool to be used in tanks differing significantly in size (e.g., tanks ranging from 15.5 feet tall and a 500 barrel storage capacity to 50 feet tall and 500,000 barrel capacity).

There further exists a need for a tank tool that injects a hot oil adjacent the liquid/gas interface in the tank to significantly reduce the Reid Vapor Pressure.

There is a need for a tank tool that is configured to be attached to a floating roof of a tank to achieve one or more of the following: (i) position the tank tool at the top or uppermost portion of the tank without any floats being directly attached to tank tool; (ii) a tank tool that moves with the floating roof of the tank; and/or, (iii) one or more tank tools that are located or oriented in a specific and predetermined area/region of the tank.

There is also a need for a tool that allows for the introduction of nitrogen under pressure in the tank to cause harmful gases to exit through one or more discharge openings or areas in the top or about the top of the tank to force harmful gases out of the one or more openings or areas in the top or about the top of the tank.

There is a further need for a tank tool that reduces the stress on one or more floats that are directly attached to the tank tool.

Moreover, there is a need for a tank tool that acts to ground an interior of the tank when, for example, a non-conductive substance is applied to an interior surface of tank such that any grounding system attached to the exterior surface of the tank is ineffective at grounding the interior of the tank.

Preferred aspects of the present invention are designed to address one, several or all of the above issues as well as other issues that will be readily understood by one of ordinary skill in the art.

OBJECTS AND SUMMARY OF THE INVENTION

An object of a preferred form of the present invention is to provide a novel and unobvious tank tool.

Another object of a preferred form of the present invention is to provide a tank tool that acts on one or more fluids/substances passing through the tank tool (upwardly or downwardly) to improve at least one aspect of the one or more fluids/substances passing through the tank tool.

A further object of a preferred form of the present invention is to provide a tank tool having one or more impellers/agitators that act on one or more fluids/substances passing through (e.g., upwardly or downwardly) the tank tool to improve at least aspect of the one or more fluids/substances passing through the tank tool.

Yet a further object of a preferred form of the present invention is to provide a tank tool that improves the storage and treatment of oil in the storage tank.

Still a further object of a preferred form of the present invention is to provide a tank tool that can perform at least one of the following: grounding an interior of the tank using at least the tank tool and at least one hose attached to the tank tool; agitating one or more fluids/substances traveling through the internal passageway of the tank tool to mix, stir or otherwise agitate the one or more fluids/substances traveling through the internal passageway of the tank tool; directing a hot oil adjacent the oil/vapor interface using at least the tank tool and at least one hose/conduit connected to the tank tool; and, attaching the tank tool to a floating roof of a tank.

A further object of a preferred form of the present invention is to provide one or more tank tools configured to be connected to a floating tank roof.

Still a further object of a preferred form of the present invention is to provide a plurality of tank tools attached to different portions/sections/segments of a floating tank roof.

Still another object of a preferred form of the present invention is to provide a tank tool that has one or more detachable floats where the float or floats are configured such that varying the length of the one or more detachable floats while maintaining the diameter of the floats constant or substantially constant allows the tank tool to be used in tanks differing significantly in size (e.g., tanks ranging from 15.5 feet tall and a 500 barrel storage capacity to 50 feet tall and 500,000 barrel capacity).

A further object of a preferred form of the present invention is to provide a tank tool that acts to ground an interior of the tank when, for example, a non-conductive substance is applied to an interior surface of tank such that any grounding system attached to the exterior surface of the tank is ineffective at grounding the interior of the tank.

Another object of a preferred form of the present invention is to provide a tank tool that injects a fire suppression or extinguishing substance (e.g., fire foam) into the tank where all individuals associated with the injection process are at a safe distance from the tank during the injection process and/or with the suppression or extinguishing substance being injected into the tank in a superior/optimal condition to suppress/extinguish the fire in an extremely short time period.

A further object of a preferred form of the present invention is to provide a tank tool that injects into the tank one or more cleaning fluids/substances in a superior/optimal condition to effectively and thoroughly clean the tank.

Yet a further object of a preferred form of the present invention is directed to a tank tool that includes an oil removal port for removing only good oil from the tank (i.e., oil that is not 99% or greater pure oil) located above the approximately four foot of bad oil in the bottom of the tank.

Still another object of a preferred form of the present invention is to provide a tank tool that allows for the injection of one or more chemicals at or adjacent the tank's top liquid level to treat bad oil by a chemical treater (i.e., an individual or individuals) located in a safe area.

Still a further object of a preferred form of the present invention is to provide a tank tool that evacuates vapor from the tank such that the vapor during evacuation remains in a state that will not block partially or completely one or more hoses/conduits used to evacuate the vapor from the tank including vapor having the heaviest molecules that can readily form condensation in the one or more hoses/conduits used to evacuate the vapor.

Another object of a preferred form of the present invention is to provide a tank tool with a face/support plate for one or more floats to reduce stress on the one or more floats.

Still another object of a preferred form of the present invention is directed to a tank tool that allows for the introduction of nitrogen under pressure to be directed through a main body of the tank tool and released in the tank to cause harmful gases to exit through a discharge opening in the top or about the top of the tank. The pressurized nitrogen forces the harmful gases out of the one or more discharge openings in the top or about the top of the tank.

Still a further object of a preferred form of the present invention is directed to a tank tool and associated process that injects a hot oil adjacent the liquid/gas interface in the tank to significantly reduce the Reid Vapor Pressure.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one preferred embodiment of the present invention is directed to a tank tool for a tank containing one or more fluids. The tank tool includes a body having an internal passageway, an upper end and a lower end. The internal passageway of the body extends between the upper end of the body and the lower end of the body. The lower end of the body is configured to connect a hose to the body so that a fluid can travel in the internal passageway between the upper end of the body and the lower end of the body. The upper end of the body includes at least one opening so that the internal passageway of the body is in fluid communication with an interior of the tank when the tank tool is installed in the tank to perform one or more functions. The tank tool further includes a fluid action zone configured to act on one or more fluids traveling in the internal passageway of the body of the tank tool. The fluid action zone includes at least one fluid action member for acting on one or more fluids traveling in the internal passageway of the body of the tank tool.

Another preferred embodiment of the present invention is directed to a tank tool for a tank containing one or more fluids. The tank tool includes a first body having an internal passageway, an upper end and a lower end. The internal passageway of the first body extends between the upper end of the first body and the lower end of the first body. The lower end of the first body is configured to connect a first hose to the first body so that a fluid can travel in the internal passageway between the upper end of the first body and the lower end of the first body. The upper end of the first body includes at least one opening so that the internal passageway of the first body communicates with an interior of the tank when the tank tool is installed in the tank to perform one or more functions. The tank tool further includes a second body connected to the first body of the tank tool so that the first body and the second body can be removed or installed in the tank as a unit. The second body is offset horizontally from the first body. The second body having an internal passageway offset horizontally from the internal passageway of the first body. The second body further includes an upper end and a lower end. The internal passageway of the second body extends between the upper end of the second body and the lower end of the second body. The lower end of the second body is configured to connect a second hose to the second body so that a fluid can travel in the internal passageway of the second body between the upper end of the second body and the lower end of the second body. The upper end of the second body includes at least one opening so that the internal passageway of the second body communicates with an interior of the tank the said tank tool is installed in the tank to perform one or more functions. The tank tool further includes a fluid action zone configured to act on fluid traveling in the internal passageway of one of the first body and the second body of the tank tool. The fluid action zone includes at least one fluid action member for acting on one or more fluids traveling in the internal passageway of one of the first body and the second body of the tank tool.

A further preferred embodiment of the present invention is directed to a method comprising the steps of: (a) providing a tank tool, the tank tool including a body having an internal passageway, an upper end and a lower end, the internal passageway of the body extends between the upper end of the body and the lower end of the body, the lower end of the body is configured to connect a hose to the body so that a fluid can travel in the internal passageway between the upper end of the body and the lower end of the body, the upper end of the body includes at least one opening so that the internal passageway of the body is in fluid communication with an interior of the tank when the tank tool is installed in the tank to perform one or more functions; (b) connecting a first hose to the lower end of the body of the tank tool; (c) positioning the tank tool in a tank wherein during use of the tank tool, the tank has oil, vapor and an oil/vapor interface; (d) performing at least one of the following steps: (i) grounding an interior of the tank using at least the tank tool and the first hose; (ii) agitating one or more fluids traveling through the internal passageway of the body of the tank tool to stir or mix the one or more fluids traveling through the internal passageway of the body of the tank tool; (iii) directing a hot oil adjacent the oil/vapor interface using at least the tank tool and the first hose; and, (iv) attaching the tank tool to a floating roof of the tank so that the tank tool moves with the floating roof of the tank.

The above preferred forms of the present invention described above provide various examples of preferred embodiments of the present invention and are not to be construed as limiting the present invention to any of the preferred forms described above.

DETAILED DESCRIPTION OF THE PREFERRED EMBODIMENTS OF THE INVENTION

The preferred forms of the invention are described below with reference to FIGS. 1-11. The appended claims are not limited to the preferred forms and no term and/or phrase used herein is to be given a meaning other than its ordinary meaning unless it is expressly stated otherwise.

Various features/functions of preferred forms of the tank tool will now be briefly described. This discussion is not to be used to limit the scope of the claims but rather is merely a brief discussion of certain features/functions of preferred forms of the tank tool. In one preferred form, the floats of the tank tool have a cylindrical shape. This design allows for the same width/diameter of the float but an adjustable length of the float which allows for a longer run on the cylindrical float. Doing so increases buoyancy. Specifically, this design allows one to readily modify the amount of pull (buoyancy) by merely extending the length of the cylinder without altering the diameter of the float. The tank sizes that preferred forms of the tank tool will be used in vary significantly (e.g., from 15.5 feet tall and 500-barrel size capacity to 50 feet tall and a 500,000-barrel capacity tank). The taller the tank the longer the hose must be for the tool to work. The longer the hose the stronger (longer) the floats must be.

The internal components of preferred forms of the tank tool constitute a significant modification/enhancement/advancement over previously known devices. The internal components have multiple functions including regeneration of fire foam directly released into the tank immediately before release of the fire foam into the "flash zone" directly above a tank's top liquid level. The internal components include one or more impellers or agitators that rifle, spin or otherwise interact with the fire foam passing through the one or more impellers or agitators to significantly increase the efficiency of the fire foam. Efficiency of the fire foam is of great importance as tank fires can be extinguished with unprecedented speed using the preferred forms of the tank tool.

The one or more impellers or agitators also perform an important function when gas "tank emissions" are pulled downwardly through preferred forms of the tank tool and one or more associated hoses with the preferred forms of the tank tool via a suction pump or other suitable component. The tank tool works in the "flash zone" of the top of the tanks liquid level, to capture the full spectrum of gases. The tank tool captures the heaviest of gas molecules that otherwise would not be evacuated from the tank. The one or more impellers or agitators act on the heavy gases, rifling, stirring or otherwise mixing the heavy gases passing through the hose or hoses keeping the hose or hoses from building up with condensed liquids long enough to prevent disruption of the discharge of the heavy gases, i.e., the hose or hoses do not become blocked or partially blocked. Keeping the hose or hoses free from obstructions eliminates downtime due to liquid lock, i.e., partial or complete blockage of the hose or hoses. The ability of the preferred tank tool to remove the full spectrum of gases from the tank enables operators in the oil production business to lower the Reid Vapor Pressure on the crude oil in the storage tank. The preferred tank tool can lower the Reid Vapor Pressure ("RVP"), in part by the one or more impellers or agitators.

The secondary or auxiliary body of preferred forms of the tank tool allows for the introduction of hot oil adjacent the liquid/gas interface. The hot oil significantly reduces RVP. The hot oil may be at any suitable temperature including but not limited to temperatures ranging from approximately 100 degrees Fahrenheit up to the oil's initial boiling point. One preferred range is approximately 110 up to and including approximately 160 degrees Fahrenheit.

The one or more impellers or agitators are significant when a storage tank is cleaned. During this process, large volumes of chemicals and water are pumped into the storage tank to flush or clean the storage tank. The one or more impellers or agitators rifle, stir or otherwise act to mix the chemicals and water just before release inside the storage tank. Hence, preferred forms of the tank tool exponentially speed up the tank cleaning process.

The one or more impellers or agitators are also important to cure bad oil, i.e., oil that is less than 99% or greater pure crude oil. When oil and water tie up together and create an emulsion, a chemical is applied to the tanks oil load to treat and alleviate bad oil problems. Running the chemical treatment backwards and upwardly through the preferred tank tool allows the chemical treater (i.e., an individual or individuals) to perform the cleaning process from a safe area. Traditionally, during a chemical treatment process, one or more chemicals are added by an individual through one or more tanks lid at the tank's top. The new tool allows one or more individuals to add one or more chemicals at the tank's top liquid level from a position where the individual or individuals are safe and nowhere near the lid or lids of the tank.

Preferred forms of the tank tool are configured to be attached to a floating roof of an oil tank. A floating roof of an oil tank is typically supported above a liquid level in the tank by one or more floatation devices (e.g., pontoon type floats) attached directly to and moveable with the floating roof. Attachment of the tank tool to a floating roof eliminates the need for the tank tool to include floats and maintains the tank tool in the desired zone/region/section/portion of the tank. However, if desired, the tank tool can still include one or more floats in addition or in place of one or more floats attached directly to the floating roof. Attachment of the tank tool to the floating roof ensures that the tank tool will remain in a desired position in the tank. For example, a plurality of tank tools can be attached to different portions/regions/sections of a floating roof of a tank to act on a given zone/region/section/portion of the tank. Also, attaching the tank tool to the floating roof allows for the collection of gases from the very top of tank. This eliminates or significantly reduces the adverse effect gases can have on the floating roof that deteriorate or otherwise adversely impact the floating roof.

The internal ends of the floats can be provided with a face/support plate to reduce stress on the float.

Preferred forms of the tank tool include a secondary or auxiliary body that can remove a significant portion of "good oil" (i.e., 99% or greater pure crude oil) without interruption. Typically, there is at least 20 foot of good oil above a lower 4 foot of bad oil in a storage tank. Because the secondary or auxiliary body of the tank tool is well above the bad oil, the secondary or auxiliary body can be used to evacuate good oil without the possibility of evacuating bad oil.

Further, preferred forms of the tank tool can be used to direct or discharge chemicals into the tank to treat the bad oil so that the water can be drained off and all that remains in the tank is good oil. The secondary or auxiliary body can also be used to drain oils and/or gases from the tank.

Preferred forms of the tank tool allow for the introduction of nitrogen through the main body of the tank tool and released in the tank to cause harmful gases to exit through one or more discharge openings or areas formed in the top or about the top of the tank. The pressurized nitrogen forces the harmful gases out of the one or more discharge openings or areas in the top or about the top of the tank.

Preferred forms of the tank tool and the associated hose or hoses attached to the tank tool can be used to ground the inside of the storage tank.

FIGS. 1 Through 8 and 11

Referring to FIGS. 1 to 8 and 11, a tank tool A formed in accordance with one preferred embodiment of present invention is illustrated in one of many possible configurations. The tank tool A can take many forms including but not limited to the forms disclosed herein.

Tank tool A, in one most preferred form, includes a main body 2 having an internal passageway 4 disposed and extending between an open, lower end 6 and an open, upper end 8 of main body 2. A cover 10 is mounted above open, upper end 8 by one or more cover supports 14 creating a plurality of open areas through which one or more fluid or fluids can pass.

While two cover supports 14 (see, for example, FIG. 5) are shown, it will be readily appreciated that one or more than two cover supports 14 may be used to fix cover 10 above open, upper end 8 of main body 2. A lower end 16 of each of the cover supports 14 is preferably connected to internal wall 18 of main body 2. Lower end 16 of each of the cover supports 14 can be permanently fixed or detachably connected to internal wall 18. An upper end 20 of each of the cover supports 14 is connected to an inner surface 22 of cover 10. Upper end 20 of each of the cover supports 14 can be permanently fixed or detachably connected to inner surface 22 of cover 10. A vertically extending slot/notch can be formed in a center of the lower cover support 14 so that a center portion of the upper cover support 14 can nest in the slot/notch of the lower cover support 14. Alternatively, two or more cover supports 14 can be formed as a single piece.

Main body 2 includes a fluid action zone B to act on fluid traveling in either direction (i.e., upwardly or downwardly) through internal passageway 4. In a most preferred form, the fluid action zone B includes agitators/impellers/blades 30, 32 and 34. Agitators 30, 32 and 34 are preferably connected to internal wall 18 so that agitators 30, 32 and 34 do not move relative to wall 18. The connection can be a detachable connection where the agitators 30, 32 and 34 can be removed from wall 18 or a permanent connection where agitators 30, 32 and 34 cannot be removed from wall 18.

Figure 7:
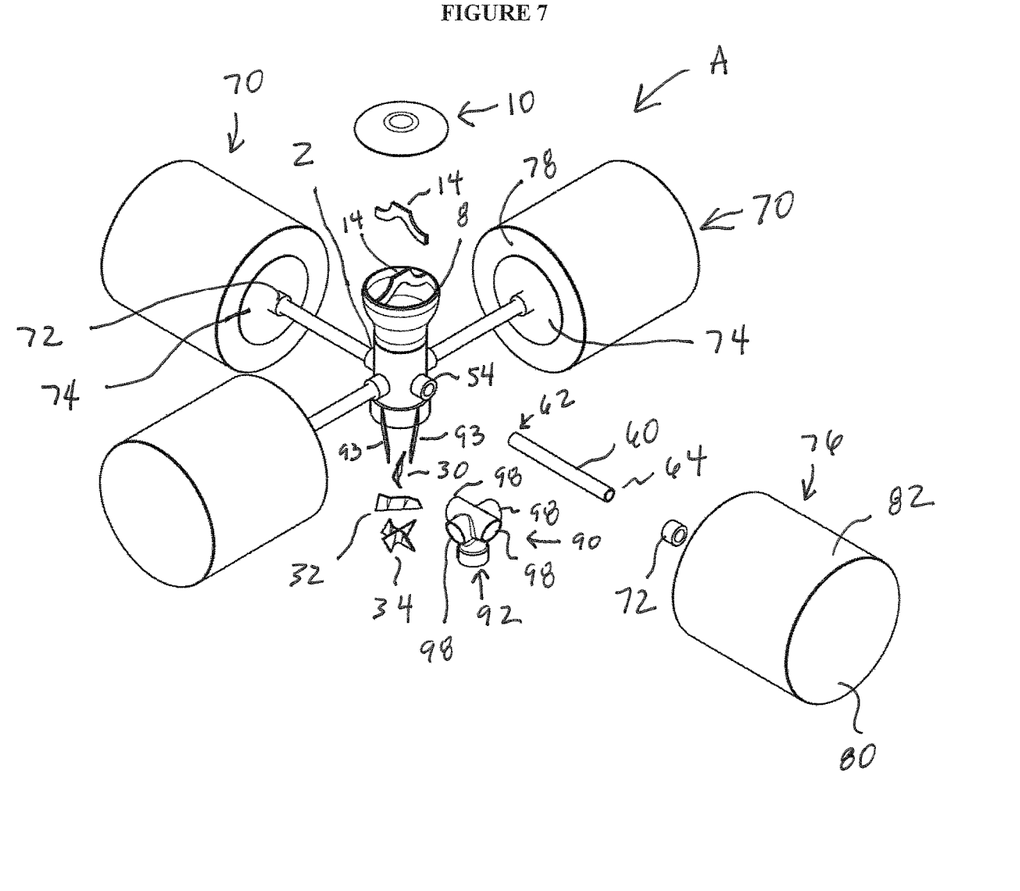
FIG. 7 is a partially exploded perspective view of the tank tool depicted in FIG. 1.
Figure 8:
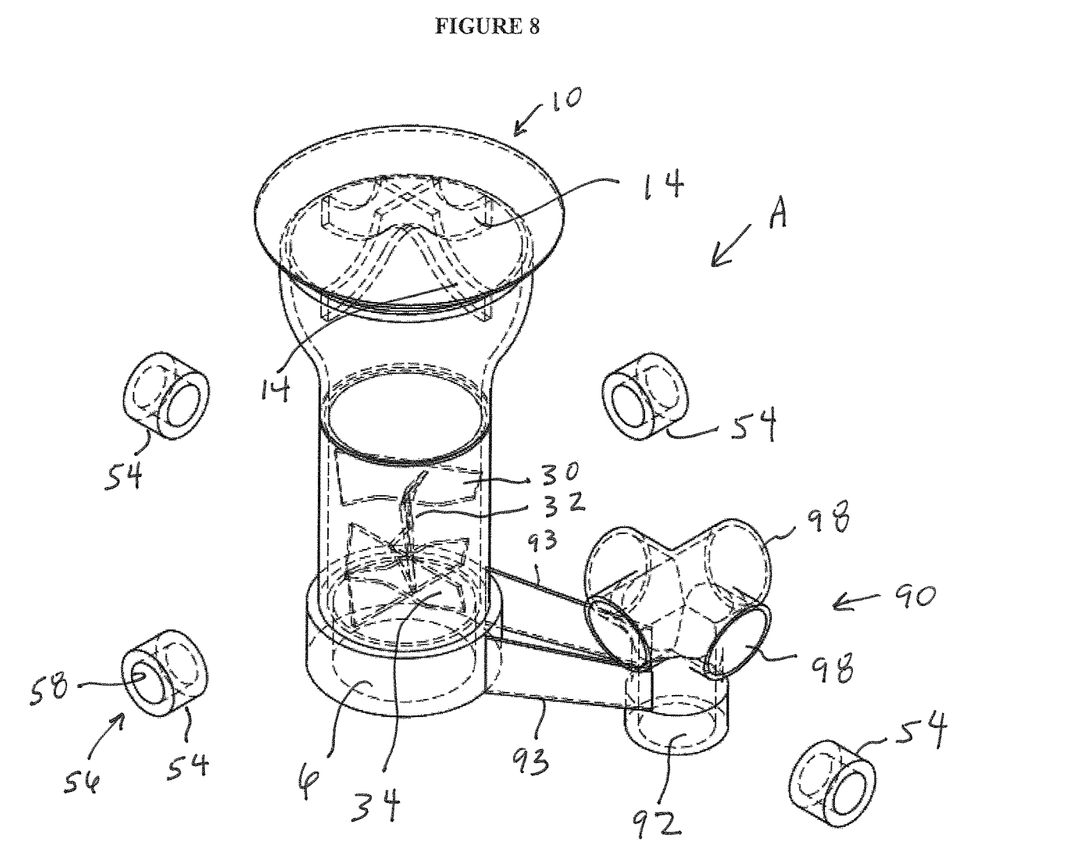
FIG. 8 is a partially exploded perspective view of the tank tool depicted in FIG. 1 with the floats removed with portions of the tank tool shown as being transparent.

Agitator 30 is disposed above agitators 32 and 34. Agitator 30 can be similar in configuration to agitator 32 but oriented differently than agitator 32 in internal passageway 4 as seen in, for example, FIGS. 4, 5 and 7. Referring to FIG. 7, each agitator 30 and 32 can include a single impeller/blade having a center section or segment 40 and outer sections or segments 42 and 44 extending outwardly and at an angle to center section 40. For example, outer segment 42 can form an obtuse angle (e.g., an angle greater than 180 degrees but less than 270 degrees) with a forward surface 46 of section 40 and outer segment 44 can form an obtuse angle (e.g., greater than 90 degrees but less than 180 degrees) with surface 46 of segment 40.

Agitator 34 can be formed from two or more impellers or blades with one or more of the impellers or blades having a notch or slot to receive a center portion of another adjacent impeller or blade. Each impeller or blade of agitator 34 can be formed similar to or the same as agitators 30 and 32. Alternatively, agitator 34 can be formed as a single piece. By varying the configuration and/or orientation of the agitators in zone B, each agitator can act differently on fluid passing through the corresponding portion of zone B.

Fluid action zone B can be disposed closer to open, lower end 6 than open, upper end 8. However, the positioning of fluid action zone B in passageway 4 can be readily varied as desired. Further, while fluid action zone B is shown as having three agitators, the number of agitators may be readily varied as desired. Further, while a space is shown between agitators 32 and 34 and a space is shown between agitators 32 and 34 (i.e., no agitator is in direct contact with an adjacent agitator), agitator 32 can be in direct contact with agitators 30 and 34. The lower portion of main body can have internal threads 50 for detachably connecting a fluid transport conduit or hose 52 to the lower portion of main body 2. However, a hose or conduit can be detachably connected to main body 2 in numerous other ways.

Figure 1:
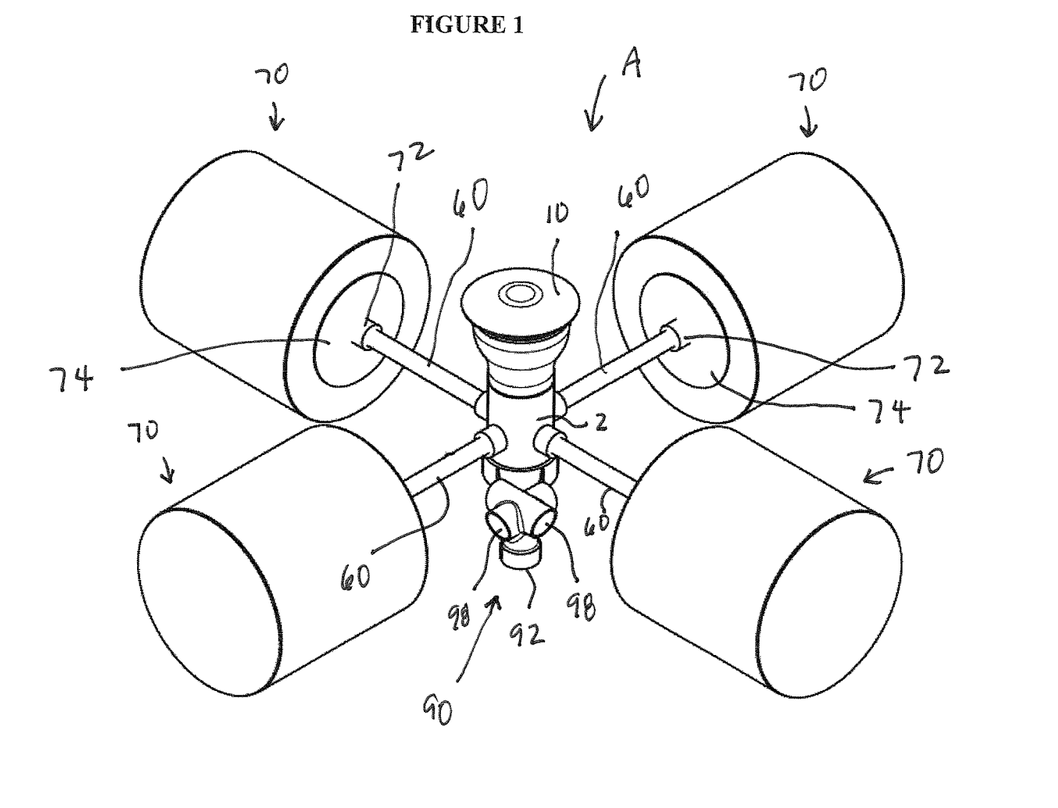
FIG. 1 is a perspective view of a tank tool formed in accordance with one preferred embodiment of the present invention.
Figure 2:
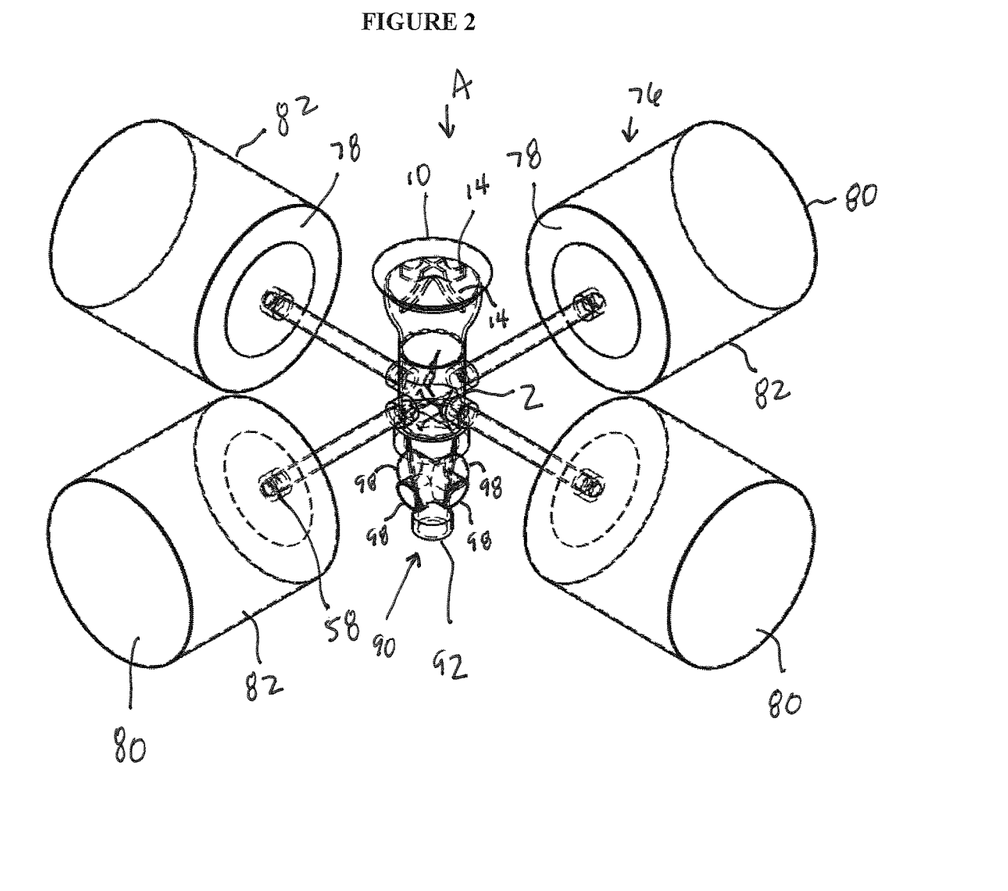
FIG. 2 is a perspective view of the tank tool depicted in FIG. 1 with portions of the tank tool shown as being transparent so that internal components (e.g., cover supports and agitators) can be readily seen.
Figure 3:
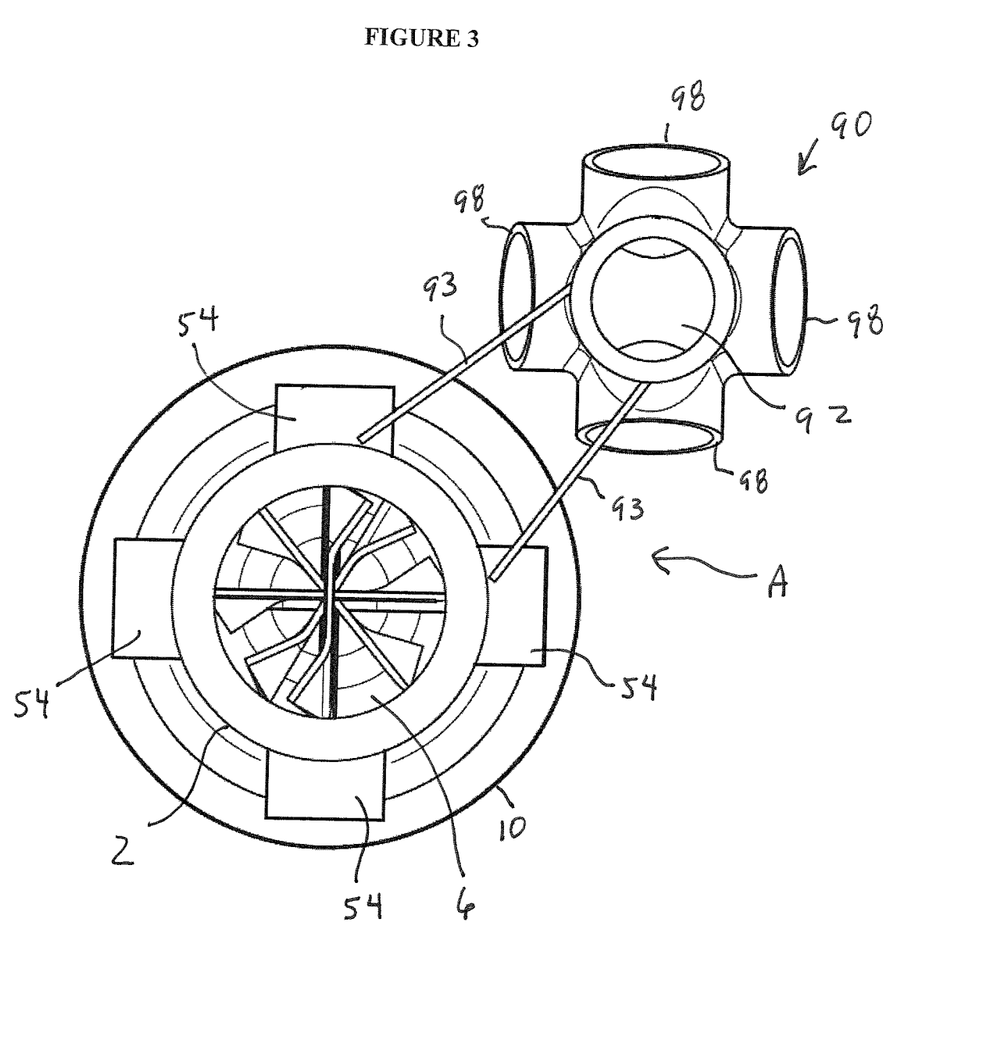
FIG. 3 is a bottom, plan view of the tank tool depicted in FIG. 1 with the detachable floats removed.
Figure 4:
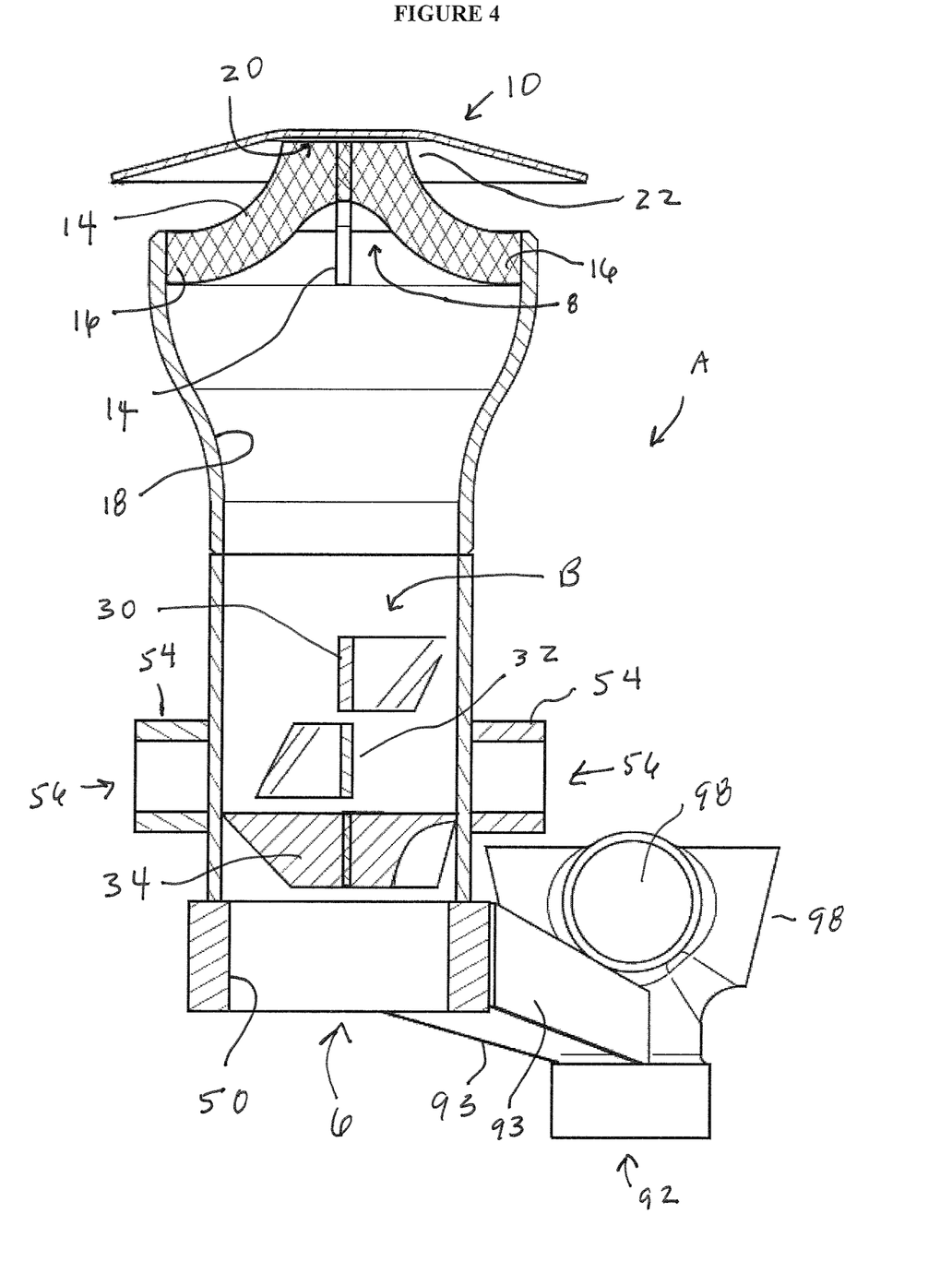
FIG. 4 is an elevational view showing in cross-section a portion of the tank tool depicted in FIG. 1 with the detachable floats removed.
Figure 5:
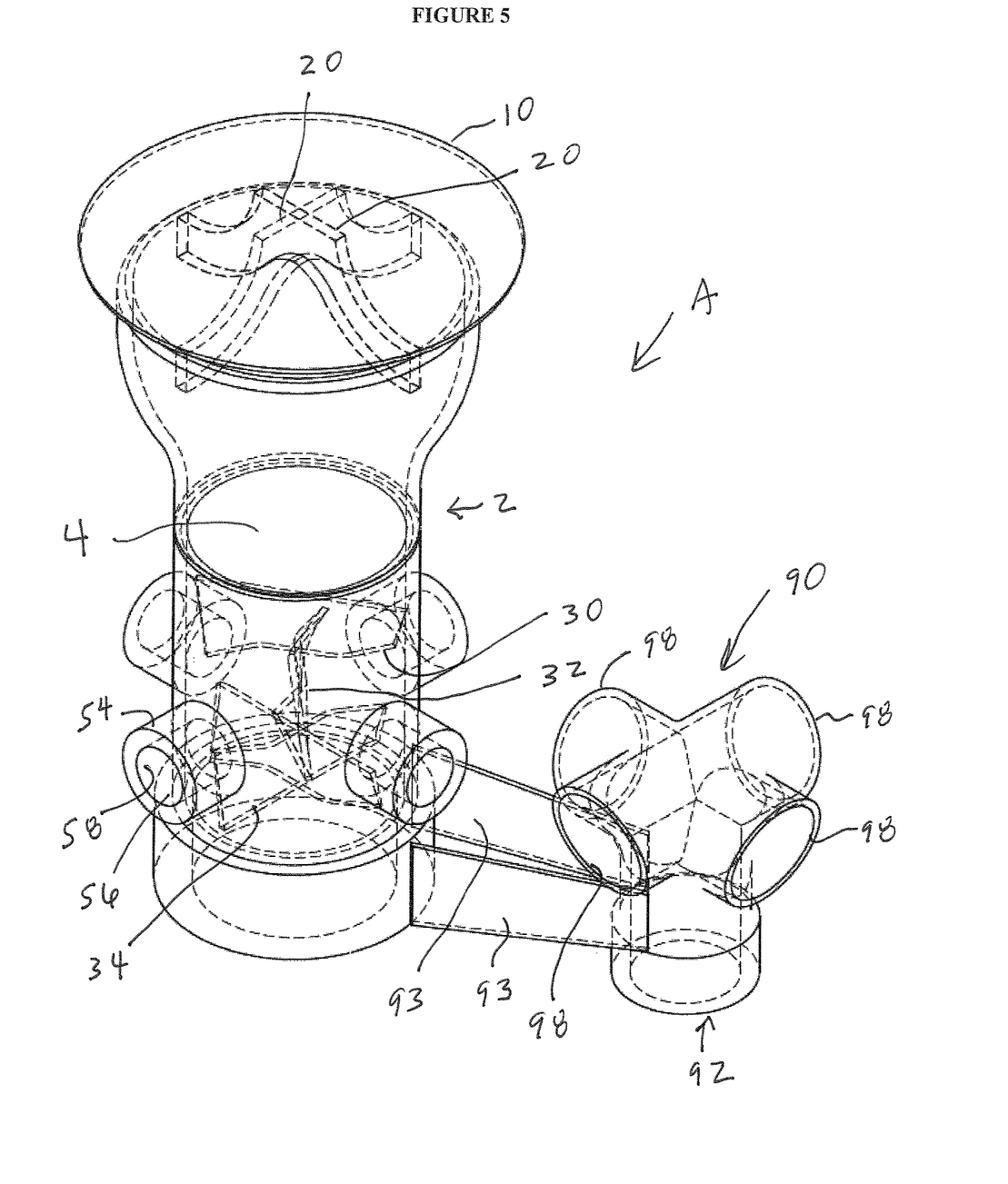
FIG. 5 is a perspective view of the tank tool depicted in FIG. 1 with the detachable floats removed and with the tool cover and main body shown as being transparent so that internal components (e.g., cover supports and agitators/impellers) can be readily seen.

Connection junctures/segments/sections 54 are connected to an outer surface of main body 2. The connection can be a permanent connection (e.g. welding) or a detachable connection. Connection segments 54 are preferably uniformly spaced about the outer circumference of main body 2. Referring to FIGS. 4 and 7, each connection segment 54 preferably includes an open end 56 and an internal threaded section 58 which can extend the entire length of segment 54 or a portion thereof for detachably connecting a threaded inner end 62 of a float support shaft 60. Outer end 64 of each float support shaft 60 is preferably threaded to detachably connect to an inner end of a corresponding float 70. Each float 70 preferably includes a connection juncture/segment/section 72 similar to sections 54 having an open, inner end and a threaded section to allow the threaded outer end 64 of float support shaft 60 to be detachably connected to a corresponding float 70.

Sections 72 are each preferably connected to a circular face plate 74 of a corresponding float 70 to reduce stress on the corresponding float 70. The circular face plate 74 can have a diameter less than the diameter of the corresponding float 70. The thickness of face plate 74 can be varied as desired. Each float includes a cylindrical body 76 having an inner surface or wall 78, an outer surface or wall 80 and a cylindrical section 82 connecting inner surface 78 to outer surface 80. Each floated is sealed to form an interior air/gas chamber. The cylindrical configuration of floats 70 allows one to readily modify the amount of pull (buoyancy) by merely extending the length of the cylindrical section 82 without altering the diameter of the float.

Tank tool A further includes a secondary or auxiliary body 90 preferably connected to main body 2 by one or more support arms 93 such that secondary body 90 cannot move relative to main body 2. Lower end 92 of body 90 is open and includes internal threads to allow a fluid transport conduit or hose 94 to be detachably connected to lower end 92 of body 90. Upper end 96 of body 90 can be formed with one or more open ports 98 that allow one or more fluids in tank C to enter body 90 and travel downwardly through an internal passageway formed in body 90 communicating with open ports 98 and open lower end 92 to allow one or more fluids to be evacuated from the interior of tank C through body 90 and hose 94 without passing through main body 2. Similarly, one or more fluids can be injected into tank C through hose 94 and body 90 without passing through main body 2. As is readily seen in FIG. 5, body 90 is offset horizontally from body 2 so that the internal passageway of body 90 is offset horizontally from the internal passageway of body 2.

Tank tool A can be formed from any suitable material including but not limited to metal (e.g., stainless steel) or other material. Hoses or conduits 52 and 94 can be connected to a pump (e.g., vacuum pump or pressure pump) to evacuate (vacuum pump) one or more fluids (e.g., liquid and/or gas) from tank C or inject (pressure pump) one or more fluids (e.g., liquid and/or gas) into tank C. The pumps will be located outside of tank C and may have one or more hoses or conduits connected from an exterior of tank C to a port or access opening formed in a portion of tank C (e.g., a wall of tank C). The lower end of the corresponding interior hose attached directly to tank tool A will be connected from the interior of tank C to the port. A closure device may be provided to seal the port when tank tool A is not being used.

Figure 6:
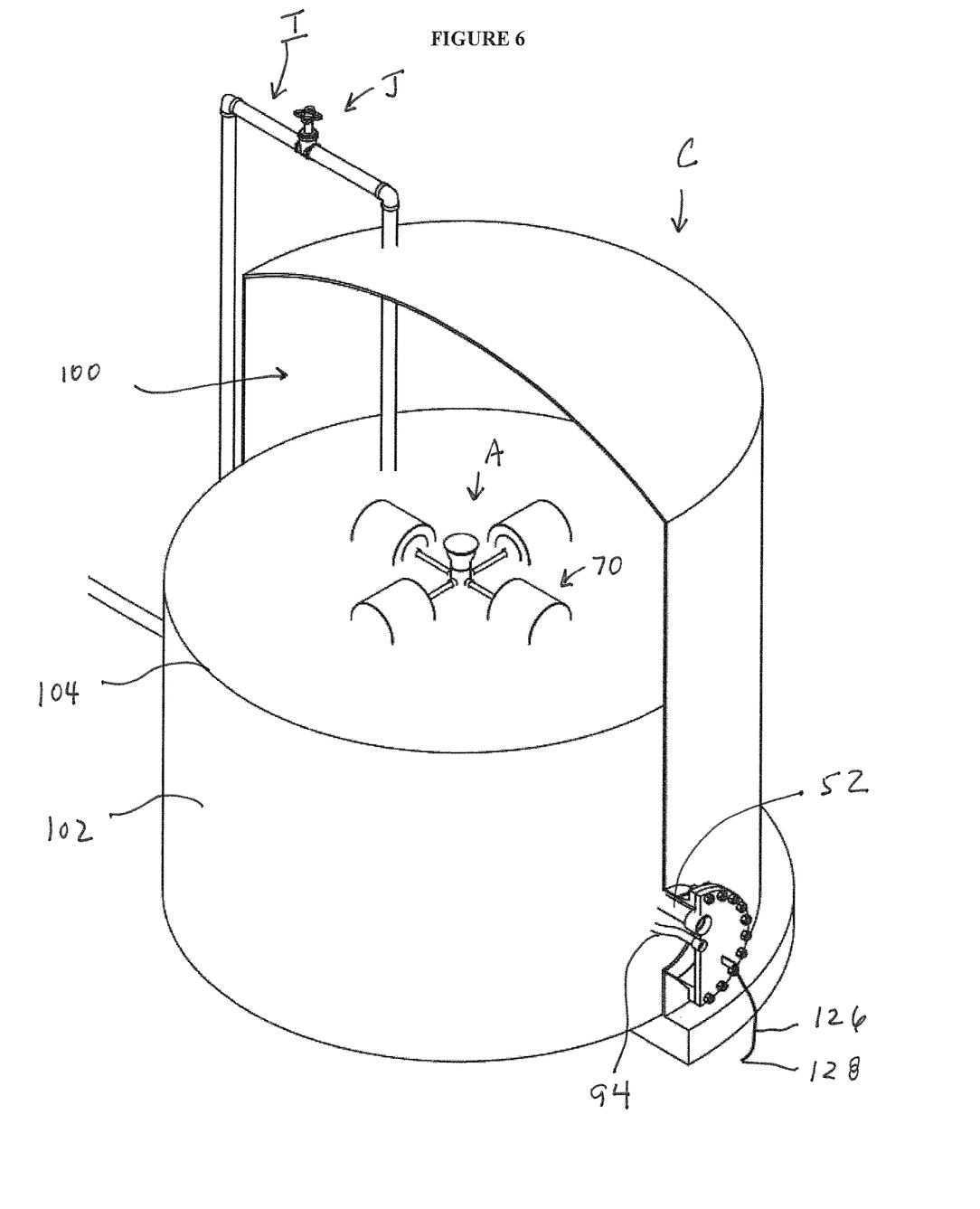
FIG. 6 is a sectional perspective view of a tank housing a liquid and a gas with the tank tool depicted in FIG. 1 shown in one of many different possible operating positions.

Referring to FIG. 6, tank C includes a gas 100 above a liquid 102 (e.g., oil) creating a gas/liquid interface 104. Preferably, tank tool A is configured such that open, upper end 8 of main body 2 is disposed above the gas/liquid interface 104 and ports 98 are disposed just below and/or adjacent (e.g., at, slightly above or slightly below) gas/liquid interface 104. This configuration allows for body 2 and body 90 to perform different functions/process. For example, a fire foam or other fire extinguishing substance can be injected into the "flash zone" directly above a tank's top liquid level. The fluid action zone B acts on the fire foam or other fire extinguishing substance to deliver the fire foam or other fire extinguishing substance into the "flash zone" in a superior/optimal condition to suppress/extinguish the fire in an extremely short time period. Also, cleaning fluids can be injected into tank C through body 2 in a superior/optimal condition to thoroughly clean in the interior of the tank. Further, vapors can be evacuated from tank body 2 including the heaviest molecules without hose or conduit 52 from becoming completely or partially blocked or otherwise obstructed. Moreover, nitrogen can be injected into tank C through body 2 above gas/liquid interface 104 to cause harmful gases to be discharged out one or more open areas in the tank roof or adjacent the tank roof.

Body 90, when positioned such that at least a portion of ports 98 are disposed in the liquid, liquid (e.g., oil) can be evacuated from tank C through body 90 and hose or conduit 94. This allows for only good oil in the tank C to be evacuated as the ports 98 are positioned above the bad oil typically formed in the lower section of tank C. Body 90, when positioned adjacent gas/liquid interface 104, can be used to inject hot oil into tank C through hose or conduit 94 and body 90. Further, due to the configuration of tank tool A, body 2 and body 90 can act simultaneously to perform different or the same functions. For example, a cleaning fluid can be simultaneously injected into tank C through body 2 and body 90. Alternatively, vapor can be evacuated from tank C through body 2 while good oil is evacuated from tank C or hot oil is injected into tank C through body 90.

Figure 11:
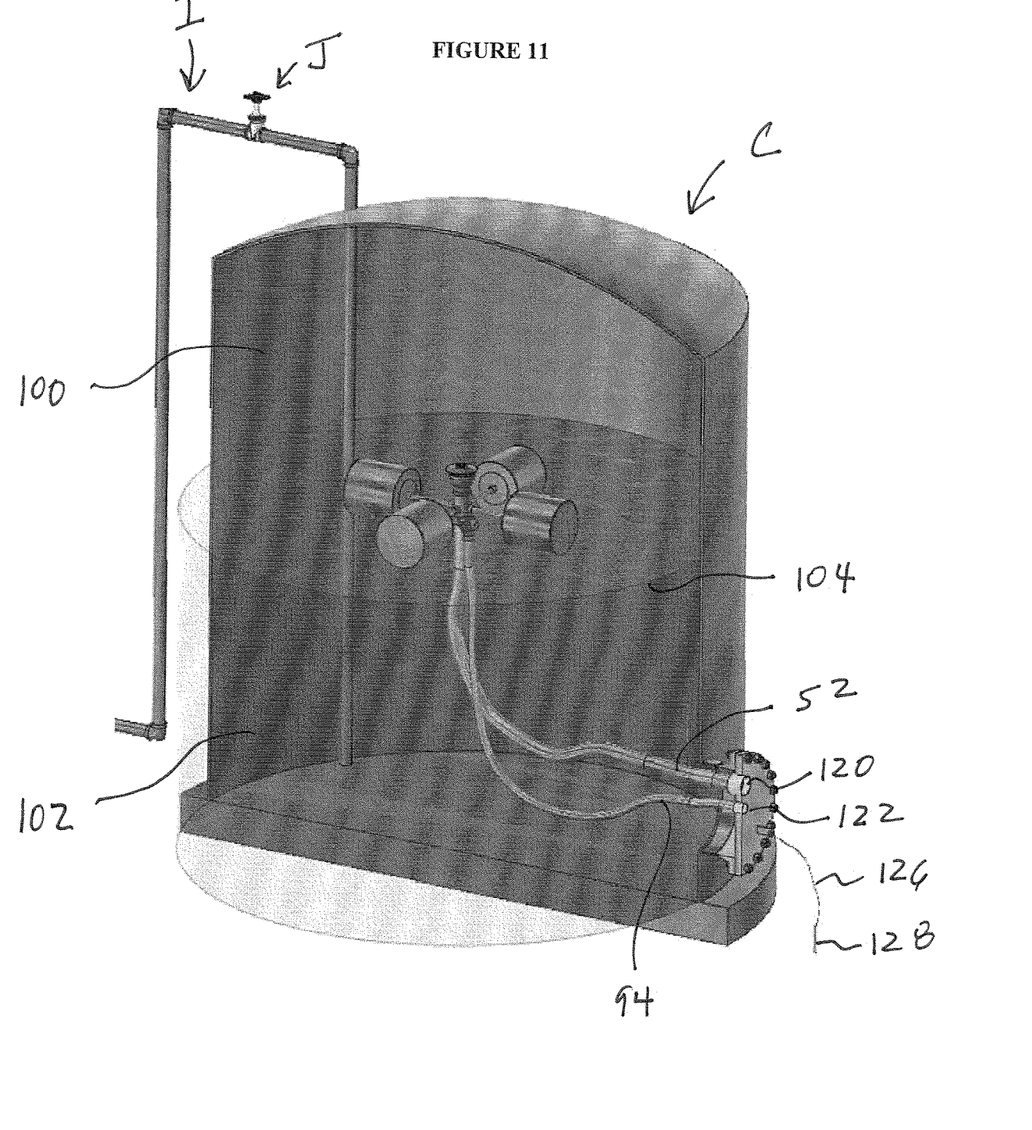
FIG. 11 is a sectional perspective view similar to FIG. 6 but with the liquid shown as being transparent so that the components in the liquid can be readily seen.

Referring to FIGS. 6 and 11, another preferred feature of this embodiment will now be described.

Tank tool A is illustrated floating in tank C having a gas/liquid interface 104. The lower ends of hoses 52 and 94 are connected to access ports 120 and 122, respectively formed in sealed man-way, door or access area 124 of tank C. A ground wire 126 connects sealed man-way or door 124 to ground bar/rod 128 partially embedded in the ground. A pump (e.g., pressure or vacuum) can be connected using one or more conduits to each of access ports 120 and 124. Tank C is shown as having a fill piping system I including a shut-off valve J for filling tank C with a desired liquid (e.g. oil).

The above described preferred (i.e., not required) feature of this embodiment is particularly advantageous as it grounds the interior of tank C even when the inner wall or walls of tank C are coated with a substance that does not conduct electricity as the tank tool A, hoses 52 and 94, ports 120 and 122, and door 124 can all be formed from or have an electrically conductive material creating an continuous electrical path from tank tool A to ground wire 126 and ground bar/rod 128.

Figure 9:
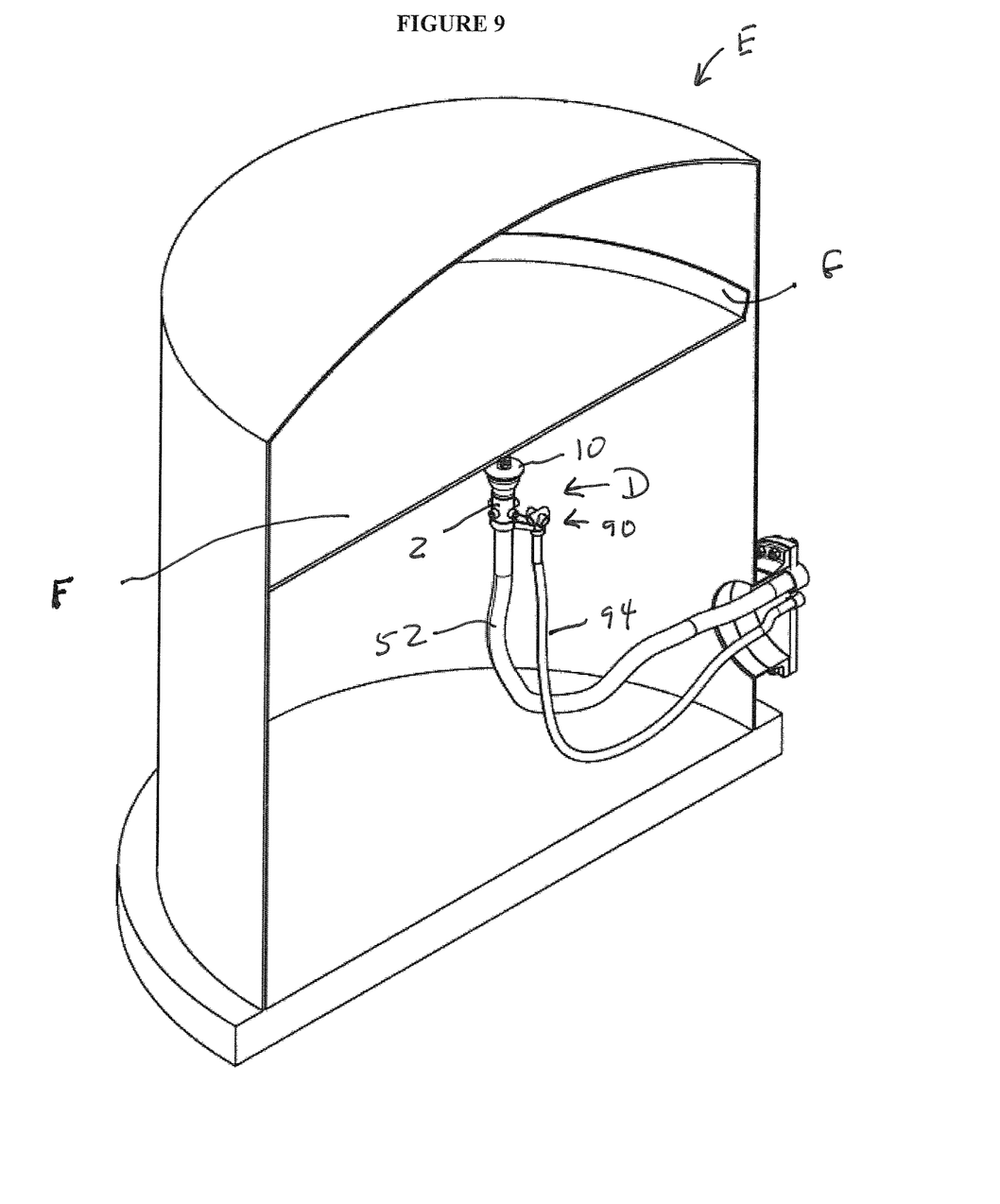
FIG. 9 is a sectional perspective view of a tank housing a liquid and a gas and having a floating roof with another preferred form of tank tool attached directly to the floating roof so that the tank tool and the floating roof move as a unit. The pontoon type floats attached directly to the floating roof to float the floating roof have been omitted.
Figure 10:
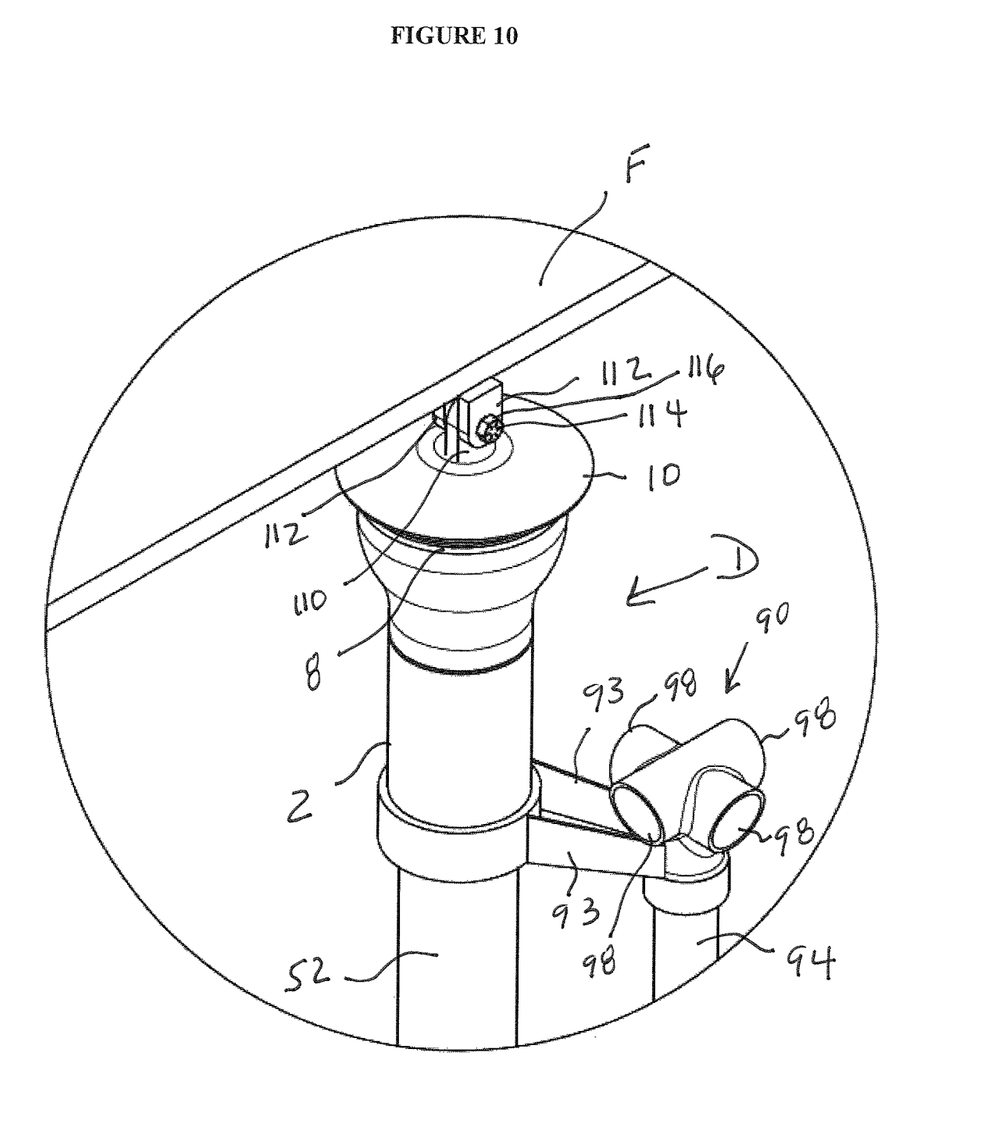
FIG. 10 is an enlarged perspective view of a portion of the embodiment depicted in FIG. 9.

FIGS. 9 and 10

Referring to FIGS. 9 and 10, a tank tool D formed in accordance with another preferred embodiment of present invention is illustrated in one of many possible configurations in tank E. The tank tool D can take many forms including but not limited to the forms disclosed herein.

Tank E includes a floating roof F that is typically supported by one or more pontoon type floats (not shown) connected to the lower or bottom surface of floating roof F to cause floating roof F to move upwardly and downwardly as the liquid level increases or decreases, respectively in tank E. Tank E may include an annular, flexible seal G connected at one end to the outer periphery of floating roof F and at the other end to the inner periphery of the tank wall of tank E. Flexible G is configured to allow floating roof F to move upwardly and downwardly as the liquid level increases or decreases, respectively in tank E.

Tank tool D is similar to tank tool A with the exception that the floats 70 and associated floating connection members (e.g., sections 54 and shafts 60) are omitted as tank tool D floats/moves with floating roof F. In describing this embodiment, the same reference numerals will be used in connection with components that are the same as the embodiment described in connection with FIGS. 1 to 8.

It is to be noted that tank tool A in the form described in connection with FIGS. 1 to 8 can be connected to floating roof F so that the floats 70 of tank tool A assist the pontoon type floats of the floating roof F or replace the pontoon type floats.

Referring to FIG. 10, a bracket or connection member 110 is connected to cover 10. A pair of brackets or connection members 112 are connected to a lower surface of floating roof F. A bolt 114 passes through corresponding openings in member 110 and members 112. Nuts 116 are threaded onto opposite ends of bolt 114 to detachably connect tank tool D to floating roof F. It is to be noted that numerous other means can be used to detachably connect tank tool D to floating roof F. By directly connecting tank tool D to floating roof F, tank tool D is maintained in a desired area or section of the interior of tank E. It should be noted that two or more tank tools D can be attached to different portions of floating roof F to operate on a given section or area of the interior of tank E.

Referring to FIG. 9, tank E includes a gas above a liquid (e.g., oil) creating a gas/liquid interface below floating roof F. Preferably, tank tool D is configured such that open, upper end 8 of main body 2 is disposed above the gas/liquid interface and ports 98 are disposed just below and/or adjacent (e.g., at, slightly above or slightly below) gas/liquid interface. Tank tool D can perform the same functions/processes described in connection with tank tool A.

While this invention has been described as having preferred designs, it is understood that the each and every preferred design can be further modified or adapted following in general the principles of the invention and including but not limited to such departures from the present invention as come within the known or customary practice in the art to which the invention pertains. The claims are not limited to the preferred embodiments and have been written to preclude such a narrow construction using the principles of claim differentiation.

I claim:

1. A method comprising the steps of:
    (a) providing a tank tool, said tank tool including a body having an internal passageway, an upper end and a lower end, said internal passageway of said body extending between said upper end of said body and said lower end of said body, said lower end of said body being configured to connect a hose to said body so that a fluid can travel in said internal passageway between said upper end of said body and said lower end of said body, said upper end of said body including at least one opening so that said internal passageway of said body is in fluid communication with an interior of a tank when said tank tool is installed in said tank to perform one or more functions;
    (b) connecting a first hose to said lower end of said body of said tank tool;
    (c) positioning said tank tool in said tank wherein during use of the tank tool, said tank has oil, vapor and an oil/vapor interface;
    (d) performing at least one of the following steps:
        (i) providing a plurality of fixed impellers in said internal passage of said tank tool and agitating one or more fluids traveling through said internal passageway of said body of said tank tool to stir or mix the one or more fluids traveling through said internal passageway of said body of said tank tool;
        (ii) directing a hot oil adjacent the oil/vapor interface using at least said tank tool and said first hose; and,
        (iii) attaching said tank tool to a floating roof of said tank so that said tank tool moves with said floating roof of said tank.

2. The method of claim 1, wherein:
    step (d) of claim 1 includes providing a plurality of fixed impellers in said internal passage of said tank tool and agitating one or more fluids traveling through said internal passageway of said body of said tank tool to stir or mix the one or more fluids traveling through said internal passageway of said body of said tank tool.

3. The method of claim 2, wherein:
    the one or more fluids is a fire foam directed upwardly and into the internal passageway of said body using said first hose.

4. The method of claim 1, wherein:
    step (d) of claim 1 includes attaching said tank tool to a floating roof of said tank so that said tank tool moves with said floating roof of said tank.

5. The method of claim 4, further includes the following step of:
    agitating a fire foam traveling upwardly through said internal passageway of said body of said tank tool to stir or mix the fire foam traveling through said internal passageway of said body of said tank tool prior to releasing the fire foam in said tank through the at least one opening of the upper end of the tank tool.

6. The method of claim 5, further includes the following step of:
prior to step (a) of claim 4, floating said tank tool so that the at least one opening of the upper end of said tank tool is positioned above the oil/vapor interface.

7. The method of claim 2, wherein:
the one or more fluids is a vapor drawn downwardly though the internal passageway of said body using a vacuum pump operably connected to a lower end of said first hose.

8. The method of claim 2, wherein:
the one or more fluids include a mixture of water and one or more cleaning chemicals passing upwardly through said internal passageway of said tank tool.

9. The method of claim 1, wherein:
step (d) of claim 1 includes directing a hot oil adjacent the oil/vapor interface using at least said tank tool and said first hose.

10. A method comprising the steps of:
(a) providing a tank tool, said tank tool including a body having an internal passageway, an upper end and a lower end, said internal passageway of said body extending between said upper end of said body and said lower end of said body, said lower end of said body being configured to connect a hose to said body so that a fluid can travel in said internal passageway between said upper end of said body and said lower end of said body, said upper end of said body including at least one opening so that said internal passageway of said body is in fluid communication with an interior of a tank when said tank tool is installed in said tank to perform one or more functions; and,
(b) providing said tank tool with an additional body connected to said body of said tank tool so that said body and said additional body can be removed or installed in said tank as a unit, said additional body being offset horizontally from said body, said additional body having an internal passageway offset horizontally from said internal passageway of said body, said additional body further including an upper end and a lower end, said internal passageway of said additional body extending between said upper end of said additional body and said lower end of said additional body, said lower end of said additional body being configured to connect a second hose to said additional body so that a fluid can travel in said internal passageway of said additional body between said upper end of said additional body and said lower end of said additional body, said upper end of said additional body including at least one opening so that said internal passageway of said additional body communicates with said interior of said tank when said tank tool is installed in said tank to perform one or more functions.

11. The method of claim 10, wherein:
said internal passageway of said body has a length greater than a length of said internal passageway of said additional body of said tank tool.

12. The method of claim 11, wherein:
said upper end of said additional body is disposed below said upper end of said body.

13. The method of claim 10, further including the steps of:
discharging into said tank from said body a fire extinguishing substance; and
evacuating a liquid from said tank through said additional body.

14. A method comprising the steps of:
(a) providing a tank tool, said tank tool including a body having an internal passageway, an upper end and a lower end, said internal passageway of said body extending between said upper end of said body and said lower end of said body, said lower end of said body being configured to connect a hose to said body so that a fluid can travel in said internal passageway between said upper end of said body and said lower end of said body, said upper end of said body including at least one opening so that said internal passageway of said body is in fluid communication with an interior of a tank when said tank tool is installed in said tank to perform one or more functions;
(b) connecting one end of a first hose to said lower end of said body of said tank tool and an opposing end of said first hose to a grounded portion of said tank; and,
(c) forming said tank tool and said first hose from a conductive material to create a continuous electrical path from said tank tool to said grounded portion of said tank to ground contents stored in said interior of said tank.

15. The method of claim 14 further comprising the steps of:
connecting said opposing end of said first hose to an access port formed in an access man-way of said tank;
embedding in a ground a ground bar and connecting a ground wire to said ground bar and said access man-way; and,
forming said access port, said access man-way, said ground wire and said ground bar from a conductive material to create a continuous electrical path from said tank tool to said ground bar to ground contents stored in said interior of said tank.

* * * * *